United States Patent [19]

Baba et al.

[11] Patent Number: 4,745,542
[45] Date of Patent: May 17, 1988

[54] FAIL-SAFE CONTROL CIRCUIT

[75] Inventors: Satoshi Baba; Tadashi Nose, both of Osaka; Tetsuji Muto; Yuji Fujimura, both of Saitama, all of Japan

[73] Assignee: 501 Nec Home Electronics, Osaka, Japan

[21] Appl. No.: 796,701

[22] Filed: Nov. 12, 1985

[30] Foreign Application Priority Data

Sep. 29, 1984 [JP] Japan .................. 59-205095

[51] Int. Cl.⁴ .................. G06F 11/16; G05B 9/02
[52] U.S. Cl. .................. 364/184; 303/92; 364/426; 371/68; 371/71
[58] Field of Search .................. 364/184–187, 364/426; 371/14, 25, 67, 68, 71, 16; 318/564; 303/92, 93, 96, 97, 106, 110

[56] References Cited

U.S. PATENT DOCUMENTS

| | | | |
|---|---|---|---|
| 3,829,668 | 8/1974 | Noumi et al. | 371/68 |
| 3,882,406 | 5/1975 | Graves et al. | 371/14 X |
| 4,096,990 | 6/1978 | Strelow | 371/68 X |
| 4,198,678 | 4/1980 | Maatue et al. | 371/68 X |
| 4,270,168 | 5/1981 | Murphy et al. | 371/68 X |
| 4,400,792 | 8/1983 | Strelow | 371/68 X |

FOREIGN PATENT DOCUMENTS 2345321 10/1977 France .
2127507A 4/1984 United Kingdom .

OTHER PUBLICATIONS

EP Search Report 85308263.

Primary Examiner—Joseph Ruggiero
Attorney, Agent, or Firm—Staas & Halsey

[57] ABSTRACT

A fail-safe control circuit which requires that all control units produce control signals to operate a controlled device. The control units receive a feedback signal used for comparing with the control signal. When the control signal and the feedback signal do not match, a power supply interruption or disagreement signal causes a relay to disconnect power to the controlled device placing the controlled device in a fail-safe state.

7 Claims, 1 Drawing Sheet

FAIL-SAFE CONTROL CIRCUIT

BACKGROUND OF THE INVENTION

1. Field of the Invention

The present invention relates to a fail-safe control circuit for improving the controlling accuracy of a controlled device controlled by operation control units and, more particularly, the present invention is directed to a fail-safe control circuit which allows the operation control units to monitor a control signal for correctness and if any of the operation control units detect an error, the fail-safe control circuit fail-safes the controlled device by interrupting power thereto.

2. Description of the Related Art

A fail-safe control circuit is generally provided in control systems to force a controlled device into a safe state when a malfunction occurs and the proper operation of such a fail-safe control circuit is very important when it is concerned with the control of a device affecting people's lives. For example, in an anti-skid brake control circuit for a car, vehicle velocity and wheel rotation are monitored and supplied to an operation control unit such as a microcomputer. When wheel locking is detected, the braking operation is released to prevent the wheels from slipping thereby improving the braking function making it possible to accurately stop the car.

In an anti-skid brake control circuit, it is important to improve reliability, and therefore each control circuit is provided with a plurality of identical operation control units arranged in parallel to process the same input in synchronism with each other using the same clock signal. The operation control units control the controlled device using an output signal obtained based on majority voting type processing performed on the respective outputs of the operation control units to thereby improve reliability.

In the circuits arranged in the manner described above, an erroneous signal may be produced by the majority voting circuit when one half or more of the plurality of operation control units operate erroneously. As a result, it is impossible to determine whether the controlled device is operating correctly in accordance with the control output. In a case where, for example, a disconnection occurs in a solenoid which is the controlled device, the desired controlling operation cannot be performed which will cause a serious accident.

SUMMARY OF THE INVENTION

It is an object of the prevent invention to provide a fail-safe control circuit which allows operation control units to check their own outputs.

It is another object of the present invention to provide a fail-safe control circuit which will prevent erroneous operation when a majority of the operation control units are malfunctioning.

It is an additional object of the present invention to interrupt power to a controlled device whenever a malfunction occurs, thereby putting the controlled device in a fail-safe state.

According to the present invention, a plurality of identical operation control units process the same input in synchronism with each other based on the same clock signal to control a controlled device when coincidence is maintained among control output signals of the respective operation control units. The controlled device is forced into a safe state by an output signal generated when a disagreement is detected between each of the control output signals of the respective operation control units and an inverted control or feedback signal. That is, the control signals produced by the operation control units are used to produce a control output signal for controlling the controlled device. The control output signal is fed back to the control units by the fail-safe control circuit, monitored by the operation control units and compared with the control signals produced by the respective units. If all of the control signals do not match the fed back signal, the fail-safe control circuit disengages power to the controlled device forcing it into a failsafe state.

In the fail-safe control circuit, coincidence between the result of the operations of operation control units is necessary to produce the control output signal, so that control accuracy is improved. Further, since each of the operation control units detects disagreement between its control signal and the fed back signal, the control mode for the controlled device is forced into a fail-safe mode when a disagreement is detected by any of the operation control units. Thus, it is possible to perform fail-safe control while supervising all of the control system including the controlled load.

These together with other objects and advantages which will be subsequently apparent, reside in the details of construction and operation as more fully hereinafter described and claimed, reference being had to the accompanying drawing forming a part hereof.

DESCRIPTION OF THE PREFERRED EMBODIMENTS

Figure 1:
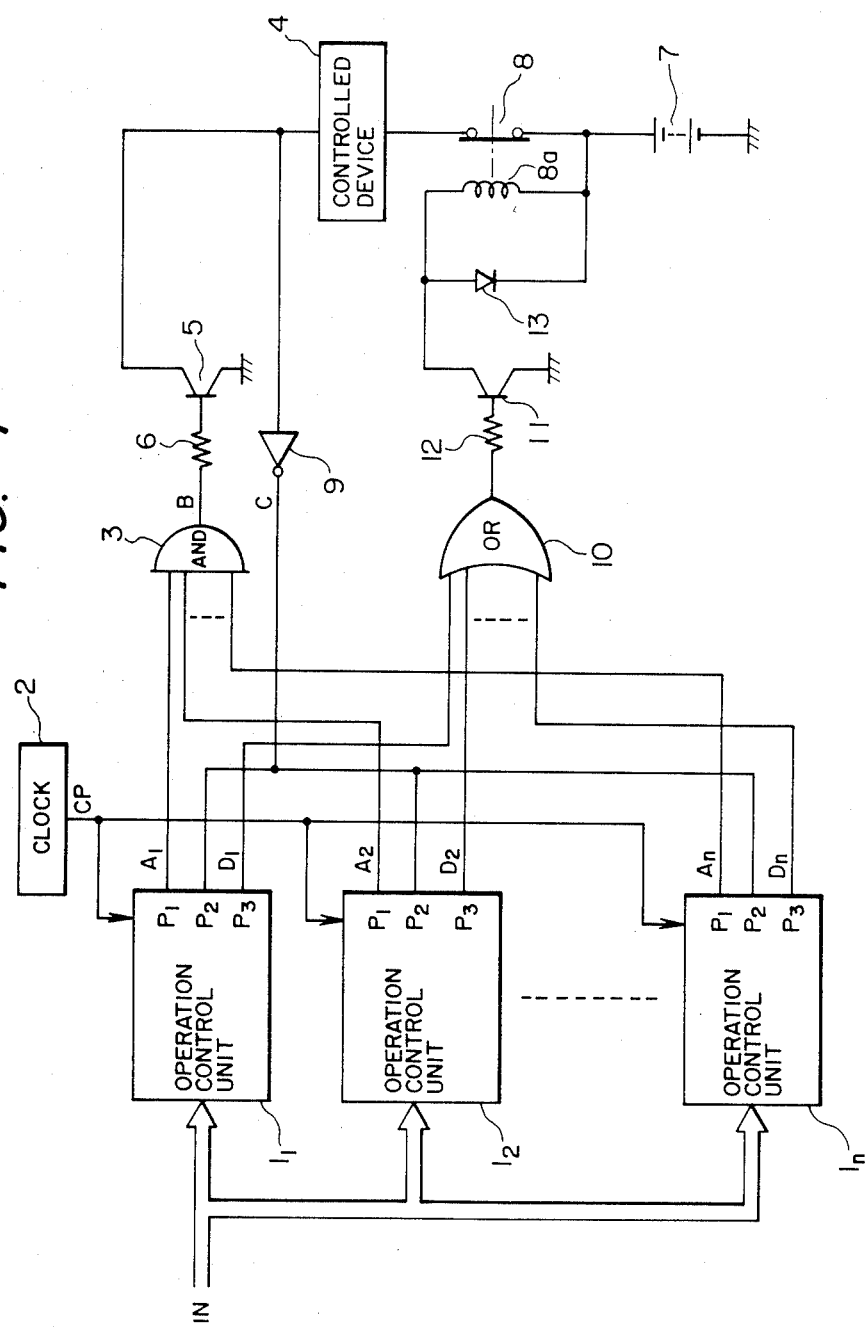
FIG. 1 illustrates an embodiment of the present invention.

FIG. 1 shows an example of a fail-safe control circuit according to the presen invention. Identical operation control units $1_1$-$1_n$ receive the same control input signal IN and the same clock signal CP generated by a clock pulse generating circuit 2. Each operation control unit $1_1$-$1_n$ normally performs identical processing to produce identical output control signals $A_1$-$A_n$ from respective ports $P_1$. An AND gate circuit 3 detects coincidence between signals $A_1$-$A_n$ and produces a control output signal B for controlling a controlled device 4. A transistor 5 is connected between the controlled device 4 and ground, and has a base receiving the control output signal B through resistor 6. A DC source 7 for energizing the controlled device 4 has a negative pole connected to ground and a positive pole connected to the controlled device 4 through a fail-safe controlling relay contact 8. An inverter 9 inverts a signal between the controlled device 4 and the transistor 5 to produce a control feedback signal C which is supplied to respective input ports $P_2$ of the operation control units $1_1$-$1_n$. Each of the control units $1_1$-$1_n$ compares the feedback signal C with their respectlve output control signals $A_1$-$A_n$ and produces a disagreement detection signal or power interruption control signal through port $P_3$ whenever coincidence does not occur. An OR gate circuit 10 receives the disagreement detection signals $D_1$-$D_n$ and produces a relay control signal when any one of the operation control units produces a disagreement signal. A transistor 11 is connected between the positive pole of the DC source 7 and ground through a relay coil $8a$, and has a base supplied with the output of the OR gate 10 via a resistor 12. A diode for absorbing-counter-electromotive force is connected in parallel with the relay coil 8a.

In the above-described fail-safe control circuit, an input signal IN, such as a vehicle speed signal, a wheel rotational speed signal, etc., is applied in common to the operation control units $1_1$-$1_n$. The operation control units $1_1$-$1_n$ each execute the same program or operation to perform processing based on the received input signal IN. The control units $1_1$-$1_n$ operate in synchronism with each other based on the commonly received clock signal C produced by the clock pulse generating circuit 2. Upon detection of a control indicating condition, such as the slip value of a wheel exceeding a predetermined reference value, the control units $1_1$-$1_n$ produce the output signals $A_1$-$A_n$ from their respective ports $P_1$. Since the operation control units $1_1$-$1_n$ execute their processings under the same conditions, the same output signals $A_1$-$A_n$ will produced from the respective operation control units $1_1$-$1_n$ when all units are operating in a normal fashion. During normal operation, the control output signal B produced by the AND gate circuit 3 is a high level "H" indicating coincidence between output signals $A_1$-$A_n$ of the respective control units $1_1$-$1_n$. The transistor 5 is turned on when it receives the control output signal B at its base. When the transistor 5 is turned on, the controlled device 4 is driven by the DC source 7 since the relay contact 8 is normally closed, thus making the anti-skid function effective.

When the transistor 5 is turned on and the controlled device 4 is operating normally, the input signal to the inverter 9 which is at a low level "L" is inverted to produce the control feedback signal C with a high level "H". The feedback signal C is supplied to the respective ports $P_2$ of the control units $1_1$-$1_n$. The control units $1_1$-$1_n$ compare the respective control output signals $A_1$-$A_n$ with the control feedback signal C, and when disagreement is detected therebetween, the control units $1_1$-$1_n$ produce the disagreement detection signals $D_1$-$D_n$ which indicate that a malfunction is occurring.

As previously discussed, the operation control units $1_1$-$1_n$ are generally computers and simple source code can be provided by one of ordinary skill in the art and added to such computerized control units that will sample an input on port P2, compare the sample to a signal output from port P1, and output a disagreement signal through port P3 whenever the signals do not match. If the control units $1_1$-$1_n$ are hard-wired logic circuits, one of ordinary skill in the art could provide a comparator for comparing the two signals and producing a disagreement output signal as necessary.

If only one of the disagreement detection signals $D_1$-$D_n$ is produced, the output signal produced by the OR gate circuit 10 is driven to a high level "H". As a result, transistor 11 energizes, relay coil 8a, so that the relay contact 8 is opened to cut off power supplied to the controlled device 4 to stop the operation thereof and to bring the controlled device 4 into a fail-safe state.

If a disagreement occurs among the output signals $A_1$-$A_n$, the control output signal B is not produced by the AND gate 3, so that the operation of the controlled device 4 is stopped thereby remaining in the fail-safe state. That is, in the fail-safe control circuit, the control output signal B is produced only when the results of operation of all the control units $1_1$-$1_n$ are coincident with each other, providing a highly reliable device. The control units $1_1$-$1_n$ compare the output signals $A_1$-$A_n$ with the control feedback signal C to determine whether the desired control is being obtained, that is, to positively detect a malfunction in the controlled load system including the AND gate 3, the resistor 6, the transistor 5, the controlled device 4, the relay contact 8, the DC source 7, and the lines connecting these parts together. Consequently, control is exercised only when it is possible to perform complete control and the state is automatically changed into a fail-safe state when an abnormal condition occurs in the controlled load system while performing a control operation, resulting in a higher degree of safety and reliability.

As described above, in the fail-safe control circuit according to the present invention, a control output is sent out only when coincidence is detected among all the respective output signals of a plurality of operation control units that are arranged to process the same input signal in synchronism with each other based on the same clock signal. Each of the operation control units detects disagreement between its output signal and a control feedback signal so that when a disagreement detection signal is produced from any one of the operation control units, a fail-safe change-over relay is driven to change-over the control mode into a fail-safe state. Accordingly, the fail-safe control system improves the accuracy of the operation control units as well as the control system including the controlled load.

The many features and advantages of the invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted, falling within the scope of the invention.

What is claimed is:

1. A fail-safe control circuit connected to operation control units producing control signals and to a controlled device, said fail-safe control circuit comprising:
   detection means for detecting coincidence between the control signals, activating the controlled device only when coincidence occurs and producing a feedback signal, each said operation control unit producing a disagreement signal when the respective control signal disagrees with the feedback signal, said detection means comprising:
      a single AND gate connected to said operation control units and the controlled device; and
      an inverter connected to said AND gate and the operation control units, and producing the feedback signal; and
   fail-safe means for placing the controlled device in a fail-safe state when at least one disagreement signal is produced.

2. A circuit as recited in claim 1, said detection means further comprising a transistor connected to said AND gate, said inverter and the controlled device.

3. A circuti as recited in claim 1, wherein the controlled device is supplied with power by a power supply and said fail-safe means comprises:
   an OR gate connected to said operation control units; and
   a relay connected to said OR gate, the power supply and the controlled device, and operated by said OR gate to disconnect power from the controlled device.

4. A circuit as recited in claim 3, said fail-safe means further comprises a transistor connected to said OR gate and said relay.

5. A fail-safe control system for a controlled device, said fail-safe control system comprising:
   identical operation control units each producing a control signal from an input signal;
   coincidence means, operatively connected to said identical operation control units and the controlled device, for producing a coincidence control signal operating the controlled device only when all the control signals are equal and producing a feedback signal, said operation control units each comparing the respective control signal to the feedback signal and producing a disagreement signal whenever the respective control signal and the feedback signal are not equal, said coincidence means comprising:
   a single AND gate connected between said operation control units and the controlled device; and
   an inverter connected between said AND gate and said operation control units; and
   fail-safe means, operatively connected to said operation control units, and said coincidence means for placing the controlled device in a fail-safe state in dependence on one of the disagreement signals.

6. A system as recited in claim 5, wherein said controlled device is supplied power by a power supply and said fail-safe means comprises power supply interruption means, operatively connected to said power supply, said coincidence means and the controlled device, for interrupting the power suplied to the controlled device in dependence on one of the disagreement signals.

7. A system as recited in claim 6, wherein said power supply interruption means comprises:
   an OR gate connected to said operation control units; and
   a relay connected to said OR gate, the power supply and the controlled device.

* * * * *

UNITED STATES PATENT AND TRADEMARK OFFICE
CERTIFICATE OF CORRECTION

PATENT NO. : 4,745,542
DATED : May 17, 1988
INVENTOR(S) : Baba et al.

It is certified that error appears in the above-identified patent and that said Letters Patent is hereby corrected as shown below:

FRONT PAGE

[73] Assignee: "501 Nec Home Electronics, Osaka, Japan"

should be --Nec Home Electronics Ltd., Osaka, Japan and

Honda Giken Kogyo Kabushiki Kaisha, Tokyo, Japan--.

Column 2, line 13, "failsafe" should be --fail-safe--;

line 39, "presen" should be --present--.

Column 3, line 1, "absorbing-" should be --absorbing--;

line 30, "translstor" should be --transistor--.

Column 6, line 12, "suplied" should be --supplied--.

Signed and Sealed this

Twenty-second Day of November, 1988

Attest:

DONALD J. QUIGG

*Attesting Officer*

*Commissioner of Patents and Trademarks*